United States Patent
Berkowitz et al.

(10) Patent No.: US 6,760,631 B1
(45) Date of Patent: Jul. 6, 2004

(54) MULTIVARIABLE CONTROL METHOD AND SYSTEM WITHOUT DETAILED PREDICTION MODEL

(75) Inventors: Peter N. Berkowitz, Houston, TX (US); William A. Poe, Richmond, TX (US); Paul Burnham Smith, Houston, TX (US)

(73) Assignee: General Electric Company, Schenectady, NY (US)

( * ) Notice: Subject to any disclaimer, the term of this patent is extended or adjusted under 35 U.S.C. 154(b) by 225 days.

(21) Appl. No.: 09/677,856

(22) Filed: Oct. 4, 2000

(51) Int. Cl.[7] .............................................. G05B 13/02
(52) U.S. Cl. .......................... 700/28; 700/30; 700/31; 700/34; 700/37; 700/46; 700/74; 318/561; 318/609; 318/610
(58) Field of Search ............................... 700/28–31, 34, 700/46, 52, 53, 67, 68, 73, 74, 33, 37, 41–45, 82; 318/561, 609–610

(56) References Cited

U.S. PATENT DOCUMENTS

| | | | |
|---|---|---|---|
| 4,739,329 A | * | 4/1988 | Ward et al. ................. 342/119 |
| 5,351,184 A | | 9/1994 | Lu et al. |
| 5,396,416 A | * | 3/1995 | Berkowitz et al. ............ 700/45 |
| 5,488,561 A | * | 1/1996 | Berkowitz et al. ............ 700/45 |
| 5,680,513 A | * | 10/1997 | Hyland et al. ................ 706/23 |
| 5,758,047 A | | 5/1998 | Lu et al. |
| 5,796,920 A | * | 8/1998 | Hyland ......................... 706/20 |
| 5,868,831 A | * | 2/1999 | Dornberger et al. .......... 117/15 |
| 6,055,524 A | | 4/2000 | Cheng |
| 6,102,958 A | | 8/2000 | Meystel et al. |
| 6,122,555 A | | 9/2000 | Lu |
| 6,132,108 A | * | 10/2000 | Kashiwamura et al. ........ 703/2 |
| 6,137,495 A | | 10/2000 | Gondek |
| 6,144,885 A | | 11/2000 | Scarrah |
| 6,144,897 A | | 11/2000 | Selliers |
| 6,248,063 B1 | | 6/2001 | Barnhill et al. |
| 6,263,355 B1 | | 7/2001 | Harrell et al. |
| 6,278,908 B1 | | 8/2001 | Durham |
| 6,289,255 B1 | | 9/2001 | Shah et al. |
| 6,476,670 B1 | * | 11/2002 | Wright et al. .................. 330/2 |

* cited by examiner

*Primary Examiner*—Ramesh Patel
(74) *Attorney, Agent, or Firm*—Karl A. Vick, Esq.; Armstrong Teasdale LLP

(57) ABSTRACT

A multivariable control method and system suitable for manipulating process variables based on observed changes in controlled objectives without extensive data analysis or involved model development. The method includes operating the process at an initial set of process variables and an initial set of controlled objectives, monitoring the set of process variables and the set of controlled objectives while continuously operating the process, adjusting one or more members of the set of process variables based upon a non-linear optimization with respect to a desired set of controlled objectives, and utilizing the monitored set of process variables and the monitored set of controlled objectives in the non-linear optimization.

24 Claims, 1 Drawing Sheet

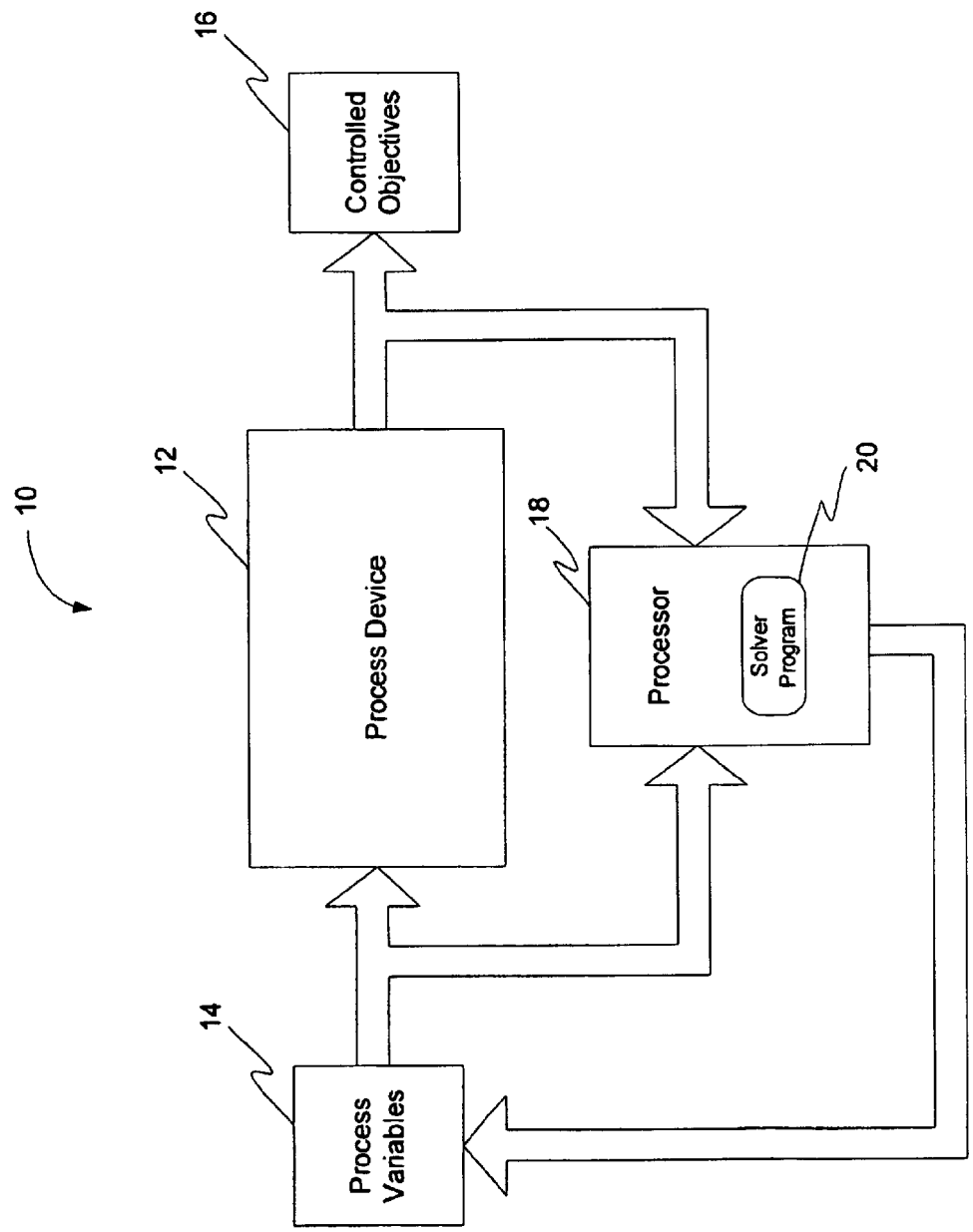

MULTIVARIABLE CONTROL METHOD AND SYSTEM WITHOUT DETAILED PREDICTION MODEL

BACKGROUND OF THE INVENTION

This invention relates generally to systems, and more particularly to a multivariable control system for manipulating process variables in the absence of a detailed a priori process model.

At least one known multivariable control technique uses a heuristic method of measuring responses to a step change of manipulated variables. Another known multivariable control technique uses a neural network expression of historical relationships of the measurements of manipulated variables. Yet another known multivariable control technique uses first principles representation of the characteristics of the process and its predicted reactions. Each of these known methods requires one or more of detailed data analysis, bump testing, or exact model development to accurately represent the multivariable control solution.

It would therefore be desirable to provide a multivariable control system that does not require detailed analysis and a priori model development., but instead is able to manipulate process variables based on changes in the controlled objectives as they occur during a process.

BRIEF SUMMARY OF THE INVENTION

An exemplary embodiment of the present invention includes a multivariable control method for controlling a process characterized by a set of process variables and a set of controlled objectives. The multivariable control method manipulates the set of process variables based on observed changes in qualitative values of controlled objectives without extensive data analysis or a priori model development. The method includes the steps of operating the process at an initial set of process variables and an initial set of controlled objectives, monitoring the set of process variables and the set of controlled objectives while continuously operating the process, adjusting one or more members of the set of process variables based upon a non-linear optimization with respect to a desired set of controlled objectives, and utilizing the monitored set of process variables and the monitored set of controlled objectives in the non-linear optimization.

Thus, a set of desired controlled objectives can be maintained without a detailed model to predict the process performances.

BRIEF DESCRIPTION OF THE DRAWINGS

FIG. 1 depicts a functional block diagram of a process control system utilizing the present invention.

DETAILED DESCRIPTION OF THE INVENTION

FIG. 1 depicts a functional block diagram of one embodiment of a process control system of the present invention. A system 10 includes a process device 12 that receives inputs that are quantified and characterized by values of process variables 14 and that produces outputs that are quantified and characterized by controlled objectives 16. For example, process device 12 is a device such as a compressor, a boiler, an extruder, an oven, a combination of interacting devices or any other mechanism that yields an end product, changes the energy content of a material, converts organic or inorganic materials from one state to another, or causes a change in the molecular structure of a component.

In one exemplary embodiment, the present invention utilizes non-linear optimization to determine the manipulations of process variables needed to achieve a desired set of controlled objectives. The process is initialized using a set of process variables determined to produce the desired set of controlled objectives. Thereafter, during operation, changes in process variables and controlled objectives are monitored and related to one another using a non-linear optimization problem solver program. Using this embodiment one or more members of the set of process variables are adjusted, based upon non-linear optimization with respect to a desired set of controlled objectives, to produce the desired set of controlled objectives. Therefore, maintaining the desired set of controlled objectives is achieved without the need for a detailed a priori data analysis or an empirically derived process model.

In operation, desired controlled objectives 16 are determined by analytical methods, visual qualification, infrared material characterization, via bar code identification, or properties catalog information. Once desired controlled objectives 16 are determined, process variables 14 that will affect the desired controlled objectives 16 are determined, such as temperature, pressure, and flow rate. The process device is then put into operation using initial values of process variables 14 that will initially produce desired qualitative values of controlled objectives 16. During operation of process device 12, changes and rates of change in process variables 14 and controlled objectives 16 are observed and measured utilizing a processor 18. Processor 18 executes a non-linear optimization problem solver program 20 to interpret the changes in process variables 14 and controlled objectives 16. If controlled objectives 16 change due to variances internal to process device 12, external environmental conditions, or variances in process variables 14, processor 18 will effect manipulations of process variables 14 needed to maintain the desired controlled objectives 16 based on computations derived from non-linear optimization problem solver program 20. This multivariable control method does not rely on an a priori knowledge of the process and in at least one embodiment is formulated solely from observations taken during production of the end product of process device 12.

In one exemplary embodiment, non-linear optimization problem solver program 20 used to interpret variations in process variables 14 and variations in controlled objectives 16, then calculate values of process variables 14 needed to maintain desired controlled objectives 16 is of the form:

Minimize or Maximize $F(x)$
Subject to $g_i(x) = 0$ for $i = 1, \ldots, m_1$ where $m_1 >= 0$
$h_j(x) >= 0$ for $j = m_{1+1}, \ldots, m$ where $m >= m_1$ Thus, there is one scalar-valued function F, of several variables, that is sought to be minimized or maximized subject to one or more other such functions that serve to limit or define the values of the variables. In one embodiment, non-linear optimization problem solver program 20 interprets values of process variables 14 and qualitative values of controlled objectives 16 to calculate the future values of process variables 14 needed to maintain desired controlled objectives 16. In another embodiment, non-linear optimization problem solver program 20 interprets changes in the values of process variables 14 and changes in the qualitative values of controlled objectives 16 to calculate the future values of process variables 14 needed to maintain desired controlled objectives 16. In yet another embodiment, non-linear optimization problem solver program 20 interprets the rate of change in the values of process variables 14 and the rate of change in the qualitative values of controlled objectives 16 to calculate the future values of process variables 14 needed to maintain desired controlled objectives 16.

In this manner, using the continuous iteration of data from the observed fluctuations in process variables 14, and controlled objectives 16, non-linear optimization problem solver program 20, utilizing sets of differential equations, is used to predict the future states of controlled objectives 16. Based on these predictions, problem solver program 20 computes adjustment of the values and rates of change of process variables .14 necessary to maintain the desired qualitative values of controlled objectives 16. Via this method of manipulating process variables 14, optimization of controlled objectives 16 can be achieved without the use of involved and detailed process models.

Thus, from a simple analysis of process variables 14 and controlled objectives 16, non-linear optimization problem solver program 20 automatically recalculates the solution and rate of change for each process variable 14 and processor 18 automatically repositions process variables 14 to maintain the desired qualitative values of controlled objectives 16 during operation of process device 12. Thereby, desired controlled objectives 16 are maintained without performing detailed data analysis, bump testing, or exact model development utilizing non-linear optimization problem solver program 20.

In an exemplary embodiment relating to a compounder of plastics, a compounder desires to use plastics process device 12 to produce a plastic product characterized by a desired set of controlled objectives 16. The compounder desires a plastic product characterized by controlled objectives 16 such as a specific color quality, a specific texture quality, and a specific density quality. The compounder logs onto a plastic manufacturer's web site and inputs the set of desired controlled objectives 16, a stored set of characteristics of process device 12, and a material identifier of the desired plastic to be produced, read via a bar code. The web site formulates the correct initial values of process variables 14 utilizing the web site's store of recipes. For example, initial values such as the temperature of the heat mechanism of process device 12, the amount of different color plastics to input to process device 12, and the flow rate of plastic input to process device 12 are formulated. The information is then returned to the plastics compounder via a communications connection and loaded into processor 18. In an exemplary embodiment of the present invention processor 18 is a personal computer or special controller. In the context of a compounder of plastics, processor 18 is a special controller for automatic control of the plastics machines and vessels. Once the compounding has begun, the values of process variables 14 and the qualitative values of controlled objectives 16 are continuously monitored by processor 18. As process variables 14, such as temperature of the heat mechanism, change the qualitative values of controlled objectives 16 will begin to change. The continuous iteration of controlled objectives 16 data are compared to the desired qualitative values of controlled objectives 16. Based on these comparisons, processor 18, utilizing non-linear optimization problem solver program 20, automatically modifies process variables 14 to maintain desired qualitative values of controlled objectives 16. For example, if the temperature of the heat mechanism changes, the temperature may be adjusted or other process variables may be adjusted to compensate for the change in temperature and maintain the desired controlled objectives. After completion of the job, the new recipe parameters are updated and processor 18, being connected to the Internet, transmits the conditions and results to a designated storage location. The web site server then calculates performance evaluations and, if necessary, modifies the recipe accordingly.

In an alternative embodiment also relating to a compounder of plastics, the compounder starts the process from a known set of control recipes and adjusts process variables 14 until desired controlled objectives 16 are achieved and then signals processor 18 to store the new controlled objectives 16 and process variables 14. Processor 18 implements non-linear optimization problem solver program 20 and reacts to changes in controlled objectives 16 as described above.

While the invention has been described in terms of various specific embodiments, those skilled in the art will recognize that the invention can be practiced with modification within the spirit and scope of the claims.

What is claimed is:

1. A multivariable control method for controlling a process, the process being characterized by a first set of process variables and a first set of controlled objectives, comprising the steps of:

operating the process at an initial set of process variables and an initial set of controlled objectives;

monitoring the first set of process variables and the first set of controlled objectives while continuously operating the process;

monitoring an effect that changes in the first set of process variables have on the first set of controlled objectives, wherein a monitored set of process variables is generated from the changes in the first set of process variables, and a monitored set of controlled objectives is generated from the effect that changes in the first set of variables have on the first set of controlled objectives; and adjusting one or more members of the monitored set of process variables based upon a non-linear optimization with respect to a desired set of controlled objectives, utilizing the monitored set of process variables and the monitored set of controlled objectives in the non-linear optimization, wherein said adjusting one or more members of the monitored set of process variables includes changing at least one of the members of the monitored set of process variables, and the monitored set is a modified version of the initial set of process variables input to a device.

2. A method in accordance with claim 1 wherein said step of monitoring the first set of process variables comprises the step of determining the changes in the first set of process variables and monitoring the changes.

3. A method in accordance with claim 2 wherein said step of utilizing the monitored set of process variables comprises the step of utilizing the changes in the first set of process variables in the non-linear optimization.

4. A method in accordance with claim 1 wherein said step of monitoring the first set of process variables further comprises the step of determining rates of change of the first set of process variables and monitoring the rates of change.

5. A method in accordance with claim 4 wherein said step of utilizing the monitored set of process variables further comprises the step of utilizing the rates of change in the first set of process variables in the non-linear optimization.

6. A method in accordance with claim 1 wherein the process produces a quantity of a product and the first set of controlled objectives excludes the quantity of the product.

7. A method in accordance with claim 1 wherein said step of monitoring the first set of controlled objectives comprises the step of determining changes in the first set of controlled objectives and monitoring the changes.

8. A method in accordance with claim 7 wherein the step of utilizing the monitored set of controlled objectives comprises the step of utilizing the changes in the first set of controlled objectives in the non-linear optimization.

9. A method in accordance with claim 1 wherein said step of monitoring the first set of controlled objectives further comprises the step of determining rates of change in the first set of controlled objectives and monitoring the rates of changes.

10. A method in accordance with claim 9 wherein the step of utilizing the monitored set of controlled objectives comprises the step of utilizing the rates of change in the first set of controlled objectives in the non-linear optimization.

11. A method in accordance with claim 1 wherein said step of adjusting one or more members of the monitored set of process variables based upon a non-linear optimization comprises the steps of:

utilizing a processor configured to execute a non-linear optimization problem solver program; and utilizing the problem solver program to calculate future sets of process variables that will result in the process maintaining the desired set of controlled objectives during operation.

12. A multivariable control system for controlling a production process characterized by a first set of process variables and a first set of controlled objectives, said system comprising:

a process device configured to produce material characterized by a desired set of controlled objectives, the desired set of controlled objectives comprising a specified color quality, a specified texture quality, and a specified density quality; and a processor configured to control said process device by adjusting the first set of process variables based upon a non-linear optimization with respect to the desired set of controlled objectives, the first set of process variables comprising values of an internal temperature of said process device, values of amounts of different color materials input to said process device, and values of a flow rate of material input to said process device, wherein the first set of process variables that are adjusted are a modified version of an initial set of process variables input to said process device.

13. A system in accordance with claim 12 wherein said system further configured to begin operation utilizing the initial set of process variables and an initial set of controlled objectives.

14. A system in accordance with claim 12 wherein said system further configured to:

monitor the first set of process variables and the first set of controlled objectives while continuously operating the process device;

generate a monitored set of process variables from a change in the first set of process variables;

generate a monitored set of controlled objectives from an effect that the change in the first set of process variables has on the first set of controlled objectives; and utilize the monitored set of process variables and the monitored set of controlled objectives in the non-linear optimization.

15. A system in accordance with claim 14 wherein said system further configured to determine and monitor at least one of the change in the first set of process variables and a rate of change in the first set of process variables, said system further configured to utilize at least one of the change in the first set of process variables and the rate of change in the first set of process variables in the non-linear optimization.

16. A system in accordance with claim 14 wherein said system further configured to determine and monitor at least one of a change in qualitative values of the first set of controlled objectives and a rate of change in the qualitative values of the first set of controlled objectives, said system further configured to utilize at least one of the change in the qualitative values of the first set of controlled objectives and the rate of change in the qualitative values of the first set of controlled objectives in the non-linear optimization.

17. A system in accordance with claim 12 wherein said processor further configured to execute a non-linear optimization problem solver program, said non-linear optimization problem solver program configured to calculate future sets of process variables that will result in the process device maintaining desired qualities of a plastic produced.

18. A multivariable control system for controlling a production process characterized by a first set of process variables and a first set of controlled objectives, said system comprising:

a process device configured to produce a product characterized by the first set of controlled objectives; and a processor configured to control said process device by adjusting the first set of process variables based upon a non-linear optimization with respect to the first set of controlled objectives, wherein the first set of process variables that are adjusted are a modified version of an initial set of process variables input to said process device.

19. A system in accordance with claim 18 wherein said system further configured to begin operation utilizing the initial set of process variables and an initial set of controlled objectives.

20. A system in accordance with claim 18 wherein said system further configured to:

monitor the first set of process variables and the first set of controlled objectives while continuously operating the process device;

generate a monitored set of process variables from a change in the first set of process variables;

generate a monitored set of controlled objectives from an effect that the change in the first set of process variables has on the first set of controlled objectives; and utilize the monitored set of process variables and the monitored set of controlled objectives in the non-linear optimization.

21. A system in accordance with claim 20 wherein said system further configured to determine and monitor at least one of the change in the first set of process variables and rates of change in the first set of process variables, said system further configured to utilize at least one of the change in the first set of process variables and the rates of change in the first set of process variables in the non-linear optimization.

22. A system in accordance with claim 20 wherein said system further configured to determine and monitor at least one of a change in the first set of controlled objectives and rates of change in the first set of controlled objectives, said system further configured to utilize at least one of the change in the first set of controlled objectives and the rates of change in the first set of controlled objectives in the non-linear optimization.

23. A system in accordance with claim 18 wherein said processor further configured to execute a non-linear optimization problem solver program.

24. A system in accordance with claim 23 wherein said non-linear optimization problem solver program configured to calculate future sets of process variables that will result in the process device maintaining a desired set of controlled objectives.

* * * * *